2,770,168
Patented Nov. 13, 1956

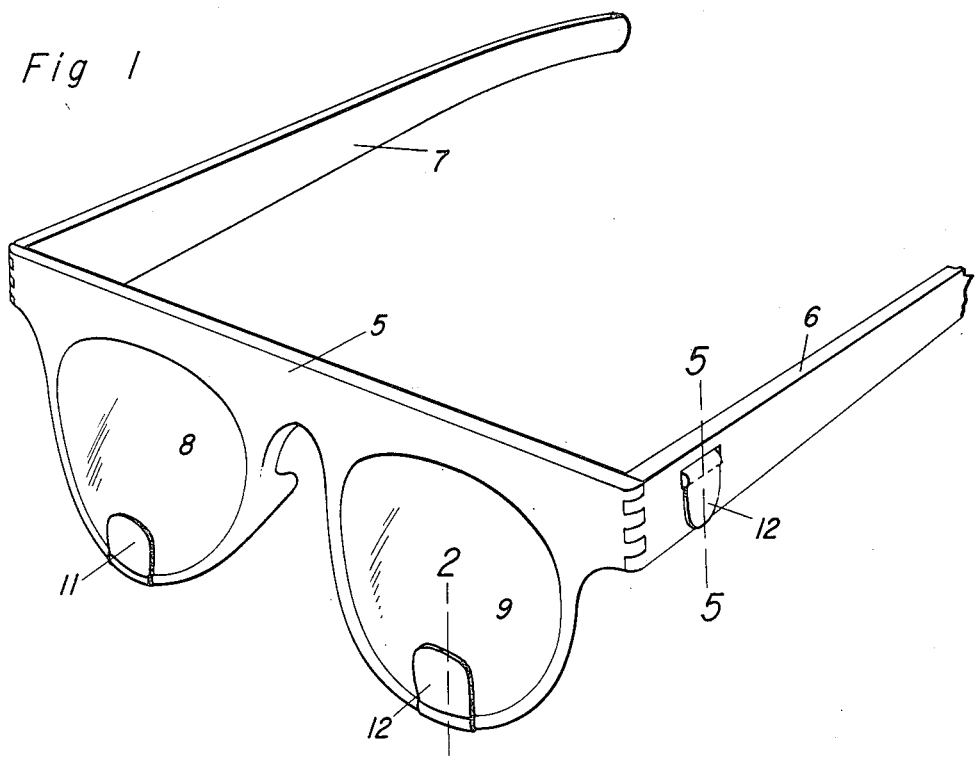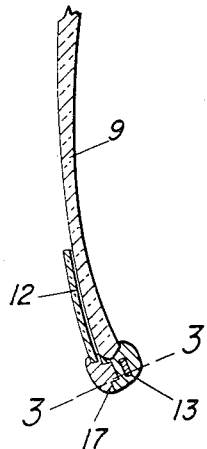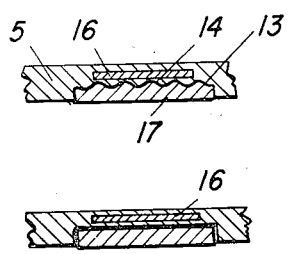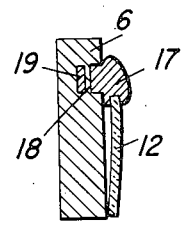

2,770,168

SUPPLEMENTAL LENS-POSITIONING MEANS

Nicholas Tesauro, San Francisco, Calif.

Application October 5, 1953, Serial No. 384,024

2 Claims. (Cl. 88—41)

This invention relates to improvements in reading glasses and has particular reference to the magnetically holding of a supplemental lens adjacent an ordinary reading lens and in such a manner that the lens will assume a definite location.

A further object is to provide means whereby the supplemental lens may be removed and stored in a portion of the frame of the glasses, preferably in the temple portions, and be held therein without danger of accidental misplacement.

A further object is to produce a device of this character which will not materially increase the cost of the ordinary frame or detract from its appearance.

Other objects and advantages will be apparent during the course of the following description.

In the accompanying drawings forming a part of this specification and in which like numbers are employed to designate like parts throughout the same, Fig. 1 is a perspective view of an eye glass frame having my invention applied thereto;

Fig. 2 is a cross sectional view taken on the line 2—2 of Fig. 1 and on an enlarged scale;

Fig. 3 is a cross sectional view taken on the line 3—3 of Fig. 2;

Fig. 4 is a similar view showing a modified form; and

Fig. 5 is a cross sectional view taken on the line 5—5 of Fig. 1 on an enlarged scale.

The wearing of a pair of glasses often requires that a person have one pair for long distance use and another pair for short distance, or a lens arrangement which will accommodate for long and short viewing, such lenses being termed bifocals.

Many people are averse to bifocals for the reason that they cause some people to stumble by their not looking through the right portion of the lens while walking on uneven ground or in going up and down stairs.

Therefore applicant has devised an arrangement whereby a supplemental lens may be quickly attached to the ordinary distance lens to add the proper correction for reading, and yet enable the user to remove this correction and store it on a part of the frame for later use.

Applicant has also found from experiments that it is imperative that the glass supplemental lens be properly position with relation to the permanent lens and that it be so held that it will not be easily jarred out of its adjusted position.

Applicant has therefore devised a frame wherein magnetic elements tend to hold a supplemental lens in front of the ordinary lens of either eye, and has also provided means for storing the supplemental lens in an adjacent part of the frame, as, for instance, the temples.

In the accompanying drawings, wherein for the purpose of illustration is shown a preferred embodiment of my invention, the numeral 5 designates the front part of the frame oftentimes referred to in its entirety as the frame.

To this frame is secured pivoted temples 6 and 7. The frame ordinarily has right and left eye lenses as shown at 8 and 9. In front of each lens I propose to position a supplemental lens as shown at 11 and 12. As both these lenses serve the same purpose and are positioned in the same manner but one will be hereinafter referred to.

Formed in the bottom of the frame adjacent the lens 9 is a recess 13 which has its bottom molded to form a wavy configuration, as shown at 14. Also included in alignment therein is a magnetic member 16. Attached to the segment 12 is a magnetically attractive material 17, also having an area which will fit within the recess 13 and having a curved surface adapted to coincide with the curved surface 14.

In the temple I have formed a similar recess 18 in which is mounted a magnet 19 the surface of which magnet is also formed with a wavy surface corresponding to the waves formed in the part 17, so that there can be no endways or sideways movement when the two parts are assembled. Consequently the supplemental lens 12 will always be maintained in proper alignment with the lens 9. Due to the magnetic attraction, the lens will be firmly held, either in its position adjacent the lens 9, or in its stored position in the temple, against accidental jars, which would otherwise displace it.

It will thus be seen that I have produced a device which will accomplish all the objects set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In combination with an eye glass frame having temples secured thereto, socket-like recesses in said frame adjacent lenses mounted in the frame and similar socket-like recesses in said temples, a magnetic element mounted in each of said recesses and a magnetically attractive metal secured to a supplemental lens, said metal on said supplemental lens having a coinciding configuration as said recesses and adapted for selective placement in respective frame and temple recesses.

2. In combination with an eye glass frame having temples secured thereto, socket-like recesses in said frame adjacent lenses mounted in the frame and similar socket-like recesses in said temples, a magnetic element mounted in each of said recesses and a magnetically attractive metal secured to a supplemental lens, said metal on said supplemental lens having a coinciding configuration as said recesses and adapted for selective placement in respective frame and temple recesses, the bottoms of said recesses having a wavy surface, the contacted portion of said supplemental lens metal having a wavy surface of the same contour as the wavy surface of said recesses whereby said wavy surfaces will coincide.

References Cited in the file of this patent

UNITED STATES PATENTS

| 2,598,272 | Krimsky | May 27, 1952 |
| 2,613,104 | Parsons | Oct. 7, 1952 |

FOREIGN PATENTS

| 686,924 | Great Britain | Feb. 4, 1953 |
| 1,037,755 | France | May 6, 1953 |